United States Patent
Skala

(10) Patent No.: US 6,394,207 B1
(45) Date of Patent: May 28, 2002

(54) THERMAL MANAGEMENT OF FUEL CELL POWERED VEHICLES

(75) Inventor: Glenn William Skala, Churchville, NY (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/504,450

(22) Filed: Feb. 16, 2000

(51) Int. Cl.$^7$ ................................................ B60K 1/00
(52) U.S. Cl. ..................... 180/65.2; 180/65.1; 180/65.3
(58) Field of Search ............... 180/65.2, 65.1, 180/65.3; 429/24, 26; 123/41.29, 41.31; 237/12.3 R; 310/54, 58

(56) References Cited

U.S. PATENT DOCUMENTS

| | | | | |
|---|---|---|---|---|
| 4,824,738 A | * | 4/1989 | Misage et al. | 429/12 |
| 5,390,791 A | * | 2/1995 | Yeager | 206/438 |
| 5,537,956 A | * | 7/1996 | Rennfeld et al. | 123/41.29 |
| 5,616,430 A | * | 4/1997 | Aoyama | 429/17 |
| 5,678,410 A | * | 10/1997 | Fujita et al. | 62/7 |
| 6,077,620 A | * | 6/2000 | Petit | 429/26 |
| 6,087,028 A | * | 7/2000 | Goto | 429/24 |
| 6,106,963 A | * | 8/2000 | Nitta et al. | 429/19 |
| 6,186,254 B1 | * | 2/2001 | Mufford et al. | 180/65.3 |

FOREIGN PATENT DOCUMENTS

| | | | |
|---|---|---|---|
| DE | 3738412 | * | 5/1989 |
| DE | 4125768 | * | 2/1993 |
| EP | 295629 | * | 12/1988 |
| GB | WO 9302884 | * | 2/1993 |

\* cited by examiner

Primary Examiner—J. J. Swann
Assistant Examiner—James S. McClellan
(74) Attorney, Agent, or Firm—Lawrence B. Plant; Cary W. Brooks

(57) ABSTRACT

Thermal management of a fuel-cell-powered electric vehicle having at least one high temperature heat transfer circuit and one low temperature heat transfer circuit each using the same dielectric heat transfer medium as the other. The circuits are in flow communication with each other so that hot heat transfer medium can flow from the high temperature circuit into the low temperature circuit, and cooler heat transfer medium can flow from the low temperature circuit into the high temperature circuit under controlled conditions for heating the fuel cell when it is cold, cooling a fuel processor when it is hot, and otherwise meeting the thermal demands of the vehicle.

9 Claims, 1 Drawing Sheet

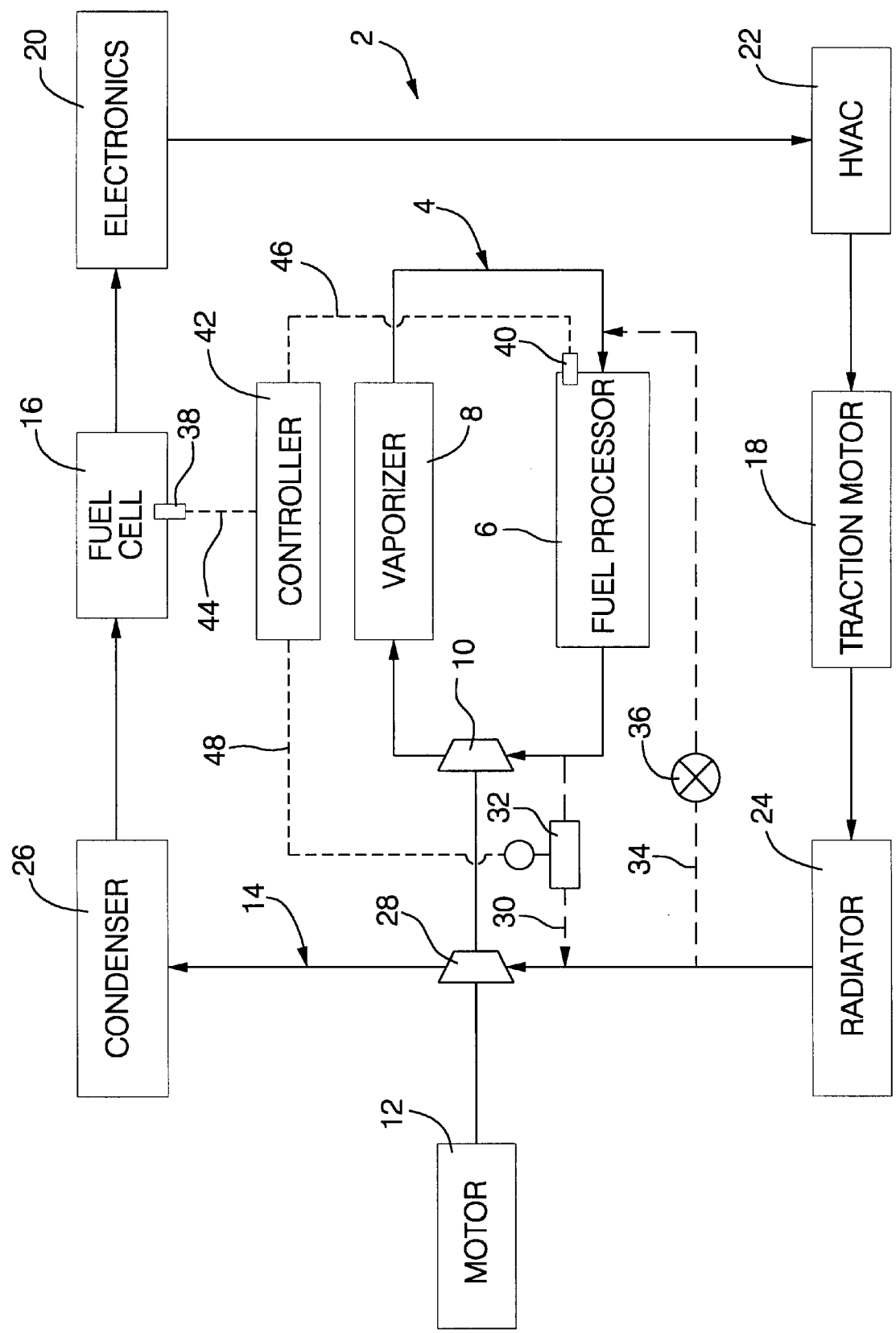

THERMAL MANAGEMENT OF FUEL CELL POWERED VEHICLES

TECHNICAL FIELD

This invention relates to fuel-cell-powered electric vehicles, and more particularly to the thermal management of such vehicles.

BACKGROUND OF THE INVENTION

The automobile industry is investigating the commercial feasibility of powering electric vehicles with hydrogen-oxygen fueled fuel cells, and particularly with so-called PEM fuel cells (a.k.a. SPE fuel cells). PEM fuel cells are well known in the art, and comprise a membrane-electrode-assembly which is a thin, proton-transitive, solid polymer membrane-electrolyte (e.g. perflourinated sulfonic acid) having an hydrogen electrode (i.e. anode) on one of its faces and an oxygen electrode (i.e. cathode) on the opposite face. The hydrogen is preferably provided by catalytically decomposing liquid hydrocarbons (e.g. methanol, gasoline etc.) into $H_2$ and $CO_2$ in a reactor known as a "fuel processor". Fuel processors can take several different forms, but generally comprise a steam reformer section where the hydrocarbon and steam react endothermically to form a reformate that includes $H_2$, $CO_2$, and some CO. The heat for the reaction is provided from either (1) an external combuster that burns a fuel to produce a heated exhaust stream that heats the reformer, or (2) a partial oxidation (POx) reactor, upstream of the steam reformer, that preheats the hydrocarbon-steam inputs to the steam reformer. The fuel processor also includes a CO clean-up section that reduces the CO content of the reformate to a sufficiently low level that it will not poison the anode catalyst of the fuel cell. The fuel processor's clean-up section typically includes: (1) a water-gas-shift reactor that exothermically reacts the CO in the reformate with water to form more $H_2$; and (2) a preferential oxidation (PrOx) reactor that selectively exothermically reacts the CO in the reformate with oxygen from the air. The CO clean up typically reduces the CO content to below about 50 PPM which the fuel cell can tolerate. This substantially CO-free is then sent to the fuel cell where it electrochemically and exothermically reacts with oxygen (from air) to produce electricity for powering the vehicle's traction motor(s). The traction motor(s) and the power electronics in the controller that controls the motor(s) are both exothermic devices in that they produce heat while in use, and must be cooled.

Heat management in fuel-cell-powered vehicles is a challenge. A number of the vehicle's components are exothermic devices in that they produce heat while in use and require cooling. Other of the vehicle's components are endothermic devices in that they require heat to be operational. For example, the fuel cell system will typically include a number of endothermic and exothermic devices such as an air compressor (exothermic), water recovery condensers (exothermic), and vaporizers (endothermic) for vaporizing water and/or fuel for use in the system, as well as a variety of other devices that either require (endothermic) or generate (exothermic) heat. Still further, the vehicle requires a heating, ventilation & cooling subsystem (HVAC)for occupant comfort. Moreover, significant differences exist between the operating temperatures of the vehicle's components. In this regard for example, the fuel cell, traction motor, and power electronics are typically maintained at relatively low operating temperatures in the range of about 80° C. to about 100° C., while the fuel processor and fuel/$H_2O$ vaporizers are maintained at relatively high operating temperatures in the range of about 200° C. to about 300° C.

Heretofore it has been the practice to provide several discrete heat transfer circuits one for the fuel cell system, one for the traction motors and power electronics and one for the HVAC system. Each system had its own componentry (e.g. plumbing, pumps, and valves), was completely isolated from the other systems, and used a heat transfer medium adapted to itself and different from the heat transfer mediums used in the other systems. Such componentry adds weight and cost to the vehicle.

The present invention is directed to an efficient, low weight and cost effective thermal management system for a fuel-cell-powered vehicle, which system utilizes the same heat transfer medium throughout, and minimizes the number of components required to manage the heat produced by the vehicle.

SUMMARY OF THE INVENTION

The present invention involves a fuel-cell-powered vehicle that has a fuel cell system for generating electricity from hydrogen and oxygen, a traction motor energized by the electricity to propel the vehicle, power electronics that control the traction motor, a heat exchanger that controls the environment in the vehicle's occupant compartment, and a radiator that expels excess heat generated by the vehicle to the ambient. The invention contemplates such a vehicle having: (1) a high temperature heat transfer circuit that includes a heat-generating fuel processor that converts a liquid hydrocarbon into hydrogen for fueling a PEM fuel cell, at least one endothermic device that extracts heat from the high temperature circuit, and a first pump that circulates a dielectric liquid heat transfer medium through the high temperature circuit; (2) a low temperature heat transfer circuit that includes the fuel cell, traction motor, power electronics, radiator, and a second pump that circulates the same dielectric heat transfer medium as is used in the high temperature circuit through the low temperature circuit; (3) a controllable first valve that communicates the high and low temperature circuits and is adapted, when open, to direct a first quantity of medium from one of the circuits (i.e. the donor circuit) into the other of the circuits (i.e. the receiving circuit); (4) a second valve that communicates the high and low temperature circuits and is adapted to direct a second quantity of the medium, equal to the first quantity, from the other (i.e. receiving) circuit to the one (i.e. donor) circuit when the first valve is open; and (5) a controller, responsive to the thermal requirements of the vehicle, for controlling the opening and closing of the first valve to change the temperature of the medium in each of the circuits as dictated by the thermal needs of the components in those circuits. Preferably, the vehicle utilizes a single motor to drive both the first and second pumps.

In accordance with one embodiment of the invention, the endothermic device comprises a vaporizer for vaporizing the hydrocarbon and/or water utilized in the fuel cell system. In another embodiment of the invention, the fuel cell includes a sensor for determining its temperature and the controller is responsive to that sensor to direct hot heat transfer medium from the high temperature circuit into the low temperature circuit when the fuel cell is undesirably cold (e.g. to thaw out the fuel cell after it has sat idle at subfreezing temperatures). According to still another embodiment of the invention, the fuel processor has a sensor for determining the temperature of the fuel processor, and the controller is responsive to that sensor to direct hot heat transfer medium from the high temperature circuit into the low temperature circuit when any part of the fuel processor (e.g. the combuster or POx sections) is too hot (e.g. when the electrical load is removed from the fuel cell before the fuel processor can slow down $H_2$ production) to extract excess heat from the medium by means of the radiator in the low temperature circuit. A particularly effective heat transfer medium comprises a dielectric oil which is liquid at 300° C., pumpable at −40° C., and has a DC volume resistivity of at least about 250 ohm-cm (i.e. as determined by ASTM Specification D-1169) in order to prevent any short circuiting of the fuel cell, or current leakage therefrom to the rest of the vehicle, via the heat transfer medium. A preferred such heat transfer medium is a paraffinic hydrocarbon having a DC volume resistivity of $1 \times 10^{12}$ ohm-cm that is sold by the Paratherm Corporation under the tradename PARATHERM OR™.

In accordance with another aspect of the invention, the invention contemplates a method of operating a fuel-cell-powered vehicle having (a) a fuel cell for generating electricity from hydrogen and oxygen, (b) a traction motor energized by the electricity for propelling the vehicle, (c) power electronics for controlling the traction motor, (d) a heat exchanger for controlling the environment in an occupant compartment of the vehicle, (e) a radiator for expelling excess heat from the vehicle, (f) a heat-generating fuel processor for converting a liquid hydrocarbon into hydrogen for fueling the fuel cell, (g) at least one endothermic device that extracts heat from the vehicle, (h) a first pump for circulating a liquid heat transfer medium in a high temperature circuit between the fuel processor and the endothermic device, and (i) a second pump for circulating the heat transfer medium in a low temperature circuit through the fuel cell, the traction motor, the power electronics, and the radiator. According to one embodiment, the method invention includes the steps of: determining the temperature of the fuel cell; pumping a first quantity of the heat transfer medium from the high temperature circuit into the low temperature circuit to elevate the temperature of the medium in the low temperature circuit and warm-up the fuel cell when it is too cold (e.g. thaw out the fuel cell); and displacing an equal quantity of the medium from the low temperature circuit into the high temperature circuit when the first quantity is being pumped into the low temperature circuit. This same technique can be used to thaw out other components of the fuel cell system especially those that contain ice. According to another embodiment, the method invention is similar to that described above for thawing-out the fuel cell and $H_2O$-containing devices, but instead is directed to providing extra cooling for an overheating fuel processor component (e.g combuster or POx) and comprises the steps of: determining the temperature of the fuel processor; and pumping a first quantity of the medium from the high temperature circuit into the low temperature circuit and an equal quantity of the medium from the low temperature circuit into the high temperature circuit to thereby cool the fuel processor.

BRIEF DESCRIPTION OF THE DRAWING

The drawing schematically depicts a preferred embodiment of the vehicle thermal management system of the present invention.

DESCRIPTION OF A PREFERRED EMBODIMENT

The invention will be better understood when considered in the light of the following detailed description of a preferred embodiment thereof.

The figure schematically depicts a thermal management system 2 for a fuel cell powered vehicle. The system 2 includes a high temperature (i.e. about 200–300° C.) circuit 4 through which a suitable dielectric, liquid, heat transfer medium such as Paratherm OR™ circulates. The high temperature circuit 4 includes a fuel processor 6 and a vaporizer 8. In its innards, the fuel processor 6 includes (1) a steam reformer heated by a combuster that is fueled by $H_2$-containing anode exhaust gas, (2) a water-gas-shift (WGS) reactor section, and (3) a preferential oxidation (PrOx) section. The dielectric liquid flows through heat exchangers associated with the combuster, WGS and PrOx sections to extract heat therefrom under normal operations, to heat up the WGS reactor during system startup, and to cool the combuster when the load is removed from the fuel cell before the fuel processor can reduce its production of $H_2$. The vaporizer 8 is part of the fuel cell operating system, and serves to vaporize liquid hydrocarbon for supply to the fuel processor, and/or to vaporize water for use in the fuel cell system (e.g. in the steam reformer and water-gas-shift reactor sections). A pump 10, driven by a motor 12, circulates the dielectric heat transfer medium through the circuit 4 wherein under normal operating conditions (a) the medium extracts heat from the fuel processor 6, and (b) the vaporizer 8 extracts heat from the medium to cool it for recirculation back through the fuel processor 6.

The system 2 also contains a low temperature heat transfer circuit 14 including (a) a PEM fuel cell 16, (b) a traction motor 18 for propelling the vehicle, (c) a power electronics package 20 for controlling the traction motor 18, (d) a heat exchanger 22 in the HVAC system for maintaining the temperature of the air in the occupant compartment of the vehicle at a comfortable level, (e) a conventional automobile-type radiator 24, or the like, for discharging heat from the heat transfer medium in the low temperature circuit to the ambient, (f) a condenser 26 for cooling the exhaust stream from the fuel cell sufficiently to condense and recover water therefrom for reuse within the fuel cell operating system, and (g) a pump 28 for circulating a dielectric liquid heat transfer medium through the low temperature circuit 14. The heat transfer liquid in the low temperature circuit is the same as that used in the high temperature circuit 4, and the pump 28 for the low temperature circuit 14 is driven by the same motor 12 that drives the pump 10 for the high temperature circuit 4.

In accordance with the present invention, the high temperature heat transfer circuit 4 and the low temperature circuit 14 communicate one with the other via a first conduit 30 containing a flow control valve 32, and a second conduit 34 containing a flow return valve 36. The valve 32 controls the flow of heat transfer medium from one of the circuits (e.g. the high temperature circuit) into the other circuit (e.g. the low temperature circuit), and will preferably be a valve such as a controllable pulse-width-modulating valve, a proportioning valve or a variable orifice valve that permits varying the amount of heat transfer medium flowing between the circuits. The flow return valve 36 in the conduit 34 is preferably a check valve that permits one way flow of the heat transfer medium from the other circuit (i.e. the receiving circuit) back to the one circuit (i.e. the donor circuit) in the same quantity as was transferred from the one circuit to the other circuit via the control valve 32.

A temperature sensor, or other temperature indicator, 38 associated with the fuel cell 16, and a temperature sensor, or other temperature indicator, 40 associated with the fuel processor 6 are coupled to a controller 42. The controller 42 receives temperature-related signals 44 and 46 from the sensors/indicators 38 and 40 respectively and, in response thereto, emits a control signal 48 that controls the opening and closing of the valve 32, as needed, to meet the temperature needs of the system. In one situation for example when the fuel cell is cold (e.g. frozen), hot heat transfer medium from the high temperature circuit 4 is directed through the control valve 32 into the low temperature circuit 14, an hence the fuel cell 16 for heating or thawing of the fuel cell 16. With appropriate routing of the low temperature circuit other cold-sensitive components of the fuel cell system can be similarly warmed or thawed. In another situation for example when the combuster in the fuel processor is too hot (e.g. immediately after the electrical load is removed from the fuel cell), hot heat transfer medium from the high temperature circuit 4 is directed through the control valve 32 into the low temperature circuit 14, and hence through the radiator 24, for cooling and return to the high temperature circuit 4 for cooling the fuel processor While the invention has been described in terms of certain specific embodiments thereof, it is not intended to be limited thereto, but rather only to the extent set forth hereafter in the claims which follow.

What is claimed is:

1. In a fuel-cell-powered vehicle having a fuel cell system for generating electricity from hydrogen and oxygen, a traction motor energized by said electricity for propelling said vehicle, power electronics for controlling said traction motor, a heat exchanger for controlling the environment in an occupant compartment of the vehicle, and a radiator for expelling excess heat from said vehicle, the improvement comprising: a high temperature heat transfer circuit including a heat-generating fuel processor for converting a liquid hydrocarbon into hydrogen for fueling a PEM fuel cell, at least one endothermic device extracting heat from said high temperature circuit, and a first pump for circulating a dielectric liquid heat transfer medium through said high temperature circuit; a low temperature heat transfer circuit including said fuel cell, said traction motor, said electronics, said radiator, and a second pump for circulating said heat transfer medium through said low temperature circuit; a first valve communicating said high and low temperature circuits and adapted, when open, to direct a first quantity of said medium from one of said circuits into the other of said circuits; a second valve communicating said high and low temperature circuits and adapted to direct a second quantity of said medium equal to said first quantity from said other circuit into said one circuit when said first valve is open; and a controller responsive to the thermal requirements of said vehicle for controlling the opening and closing of said first valve to change the temperature of the medium in each circuit.

2. The vehicle according to claim 1 including a single motor for driving both said first and second pumps.

3. The vehicle according to claim 1 wherein said firsts valve is selected from the group consisting of pulse-width-modulating valves, proportioning valves and variable orifice valves.

4. The vehicle according to claim 1 wherein said second valve is a check valve.

5. The vehicle according to claim 1 wherein said fuel cell includes a first sensor for determining the temperature of said fuel cell and said controller is responsive to said first sensor.

6. The vehicle according to claim 1 wherein said fuel processor includes a second sensor for determining the temperature of said fuel processor and said controller is responsive to said second sensor.

7. The vehicle according to claim 1 wherein said medium comprises an oil which is liquid at 300° C., pumpable at −40° C., and has a DC volume resistivity of at least about 250 ohm-cm.

8. The vehicle according to claim 7 wherein said oil is a paraffinic hydrocarbon.

9. The vehicle according to claim 1 wherein said endothermic device comprises a vaporizer for vaporizing either said hydrocarbon or water or both for use in said fuel cell system.

* * * * *